July 28, 1970  C. E. BEEBE  3,521,932

JUMBO HUB FOR MOTORCYCLES

Filed Oct. 29, 1968

INVENTOR.
CALVIN E. BEEBE

United States Patent Office 3,521,932
Patented July 28, 1970

3,521,932
JUMBO HUB FOR MOTORCYCLES
Calvin E. Beebe, R.R. 3, Linesville, Pa. 16424
Filed Oct. 29, 1968, Ser. No. 771,487
Int. Cl. B60b 27/02
U.S. Cl. 301—6                                        4 Claims

ABSTRACT OF THE DISCLOSURE

An enlarged hub for motorcycle wheels which is integral with a disc brake drum, is provided with double row ball bearing races and double weather seals for preventing water and dirt from entering the bearings.

SUMMARY OF THE INVENTION

My invention employs a center section hub cone open at both ends. End caps are disposed in sealing engagement with these ends, each cap having a peripheral U-shaped surface in mating engagement with a corresponding surface of a corresponding end to form a seal. Adjacent the seal and interiorly disposed in common with cone end caps are bearing raceways, a double row ball bearing race being disposed in each raceway and being protected by the seal from water, dirt, and the like.

The bearing races are enlarged, providing greater resistance to road shock and greater smoothness to road operation as well as less resistance to torque. A disc brake drum can be integral with the cone providing more efficient braking and reduced drum heating.

DETAILED DESCRIPTION OF PREFERRED EMBODIMENT

Figure 1:
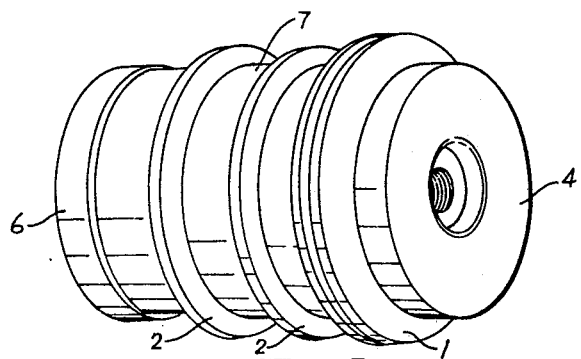
FIG. 1 is a perspective view of my invention.
Figure 2:
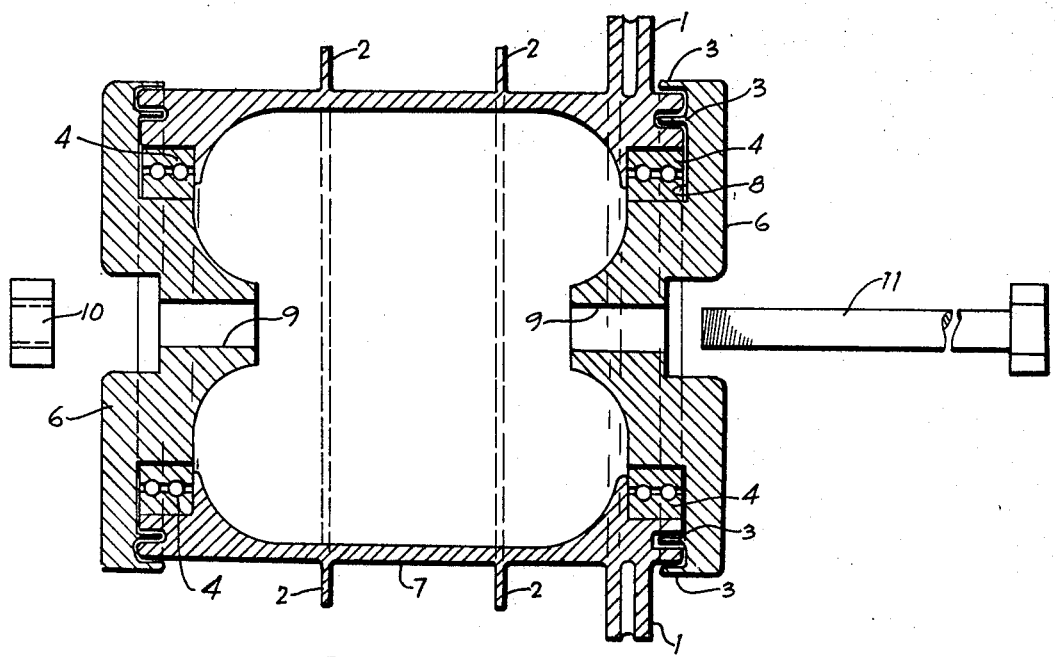
FIG. 2 is a cross sectional view thereof.

Referring now to FIGS. 1 and 2, my jumbo hub is provided with a central section hub cone or housing 7 which is integral with disc brake drum 1 and has spoke ridges 2. Double row ball bearing races 4 are disposed in raceways 8 defined between cone 7 and oppositely disposed end caps 6. A double weather seal 3 is defined by the mating surfaces of cone 7 and caps 6 wherein the appropriate surfaces of the caps resembles a U wherein the legs of the U fit into mating grooves in the cone and prevent water and dirt from entering the bearings.

The interior of cone 7 is hollow and the end caps have aligned central bores 9 with recesses to receive a nut 10 and the head of bolt 11. With the nut and bolt disposed in these recesses and the bolt extending through the aligned bores and connected to the bolt the entire structure is held together.

Front and rear frame forks are to be secured to the end caps as required.

When this hub is used in the rear of the cycle, a chain drive sprocket can be disposed around cone 7 adjacent the end cap carrying the bolt.

The structure so described reduces drum heating and road shock as well as torque resistance as well as providing greater smoothness in road operation and more efficient braking.

While I have described my invention with particular reference to the drawings, such is not to be considered as limiting its actual scope.

Having thus described this invention, what is asserted as new is:

1. A hub for a wheel of a motor cycle comprising:
   A hollow cylindrical housing open at opposite ends, a radially extending face at each end of said cylindrical housing each face having an annular axially extending groove concentric with the peripheral end surfaces of said housing;
   A pair of end caps, each cap having a pair of radially spaced apart axially extending concentric flanges, the radially outer flange extending over the peripheral end surfaces of the housing, the radially inner flange extending into said annular groove in the ends of said housing providing a double seal against foreign matter entering into the interior of the hub, said caps having centrally disposed and axially aligned transverse bores; means disposed in and connecting between said bores to secure said caps to said housing and means on said caps for supporting said housing for rotative movement thereon.

2. A hub as set forth in claim 1 wherein each cap and the corresponding end of said housing form a common circular raceway protected by said seal and have a common axis with said groove and flanges, said hub further including a ball bearing race disposed in each raceway.

3. A hub as set forth in claim 2 wherein said ball bearing race disposed in each raceway is of the double row type.

4. A hub as set forth in claim 3 further including a pair of disc flanges having at spaced intervals braces between said double discs serving as fan blades for air cooling when long distance braking is necessary, said double disc brake drum being formed integral with the hub housing for the application of disc type brakes, said disc brake drum being at one end of hub cone and extending radially outward therefrom.

References Cited

UNITED STATES PATENTS

| 1,999,696 | 4/1935 | Kitto | 308—187.1 X |
| 1,025,598 | 5/1912 | Toohey | 192—6 |

FOREIGN PATENTS

| 16,213 | 1895 | Great Britain. |

RICHARD J. JOHNSON, Primary Examiner

U.S. Cl. X.R.

301—105; 308—187.1, 191